United States Patent [19]
Consolatti et al.

[11] Patent Number: 5,764,226
[45] Date of Patent: Jun. 9, 1998

[54] REUSABLE AND MODIFIABLE DATA ENTRY INTERFACE PART

[75] Inventors: Scott M. Consolatti; Carol Ann Jones, both of Raleigh; Dennis D. King, Cary, all of N.C.

[73] Assignee: International Business Machine Corp., Armonk, N.Y.

[21] Appl. No.: 581,383

[22] Filed: Dec. 29, 1995

[51] Int. Cl.$^6$ ...................................................... G06F 3/00
[52] U.S. Cl. ............................................................ 345/333
[58] Field of Search .................................. 395/333, 334, 395/339, 348, 349; 345/333, 334, 339, 349, 354

[56] References Cited

U.S. PATENT DOCUMENTS

| | | | |
|---|---|---|---|
| 5,321,803 | 6/1994 | Ditter, Jr. .............................. | 345/335 |
| 5,335,320 | 8/1994 | Iwata et al. ............................ | 395/704 |
| 5,341,293 | 8/1994 | Vertelney et al. ...................... | 707/530 |
| 5,347,627 | 9/1994 | Hoffmann et al. ..................... | 345/334 |
| 5,404,441 | 4/1995 | Satoyama ............................... | 345/334 |
| 5,495,567 | 2/1996 | Izawa et al. ............................ | 345/334 |
| 5,537,630 | 7/1996 | Berry et al. ............................ | 345/326 |
| 5,559,947 | 9/1996 | Wugofski ............................... | 345/333 |
| 5,581,243 | 12/1996 | Ouellette et al. ....................... | 345/173 |
| 5,675,752 | 10/1997 | Scott et al. ............................. | 345/333 |

*Primary Examiner*—A. Katbab
*Attorney, Agent, or Firm*—Greg M. Doudnikoff

[57] ABSTRACT

An object-based component and system are presented which permits developers of multimedia applications to provide improved data entry interfaces for end users. The component includes a number of pre-built data entry interface styles for inclusion by a developer in an application. Each style includes a number of attributes having modifiable settings, and the attributes and settings for each style are easily extensible. A free style interface is provided which permits a developer wide latitude in developing customized data entry interfaces with relative ease.

10 Claims, 10 Drawing Sheets

REUSABLE AND MODIFIABLE DATA ENTRY INTERFACE PART

BACKGROUND OF THE INVENTION

1. Field of the Invention

The present invention relates to improvements in data processing systems and, more particularly, to a system, method and computer program for use with application development software which permits rapid construction and modification of on-screen data entry interfaces for multimedia and other software applications which require extensive and easy to use data entry interfaces.

2. Description of the Related Art

Application development tools have been introduced over recent years to make computer programming and software application development less complex and lower the learning curve for computer programmers. The most recent wave of application development tools include what are know as power tools, and includes such products as Visual Basic from Microsoft Corporation and PowerBuilder from Powersoft Corporation. These tools are especially useful for the novice user relative to the creation of graphical user interfaces (GUIs) for software applications. For basic GUI interfaces, such tools eliminate the need for a user to write code. Instead, a user creates the GUI by dragging and dropping iconic representations of pre-written components or constructs or parts from a palette, and physically connecting the components with other elements of the GUI or underlying software application. Such components may be used any number of times. However, the underlying languages for these tools are procedural languages. Components of code written in procedural languages are relatively difficult to develop for reuse and can be difficult to integrate into a program being developed. This problem increases as the size of the components increases. Accordingly, most such pre-written components for power tools are rather simple in nature, and for the most part complex GUI elements or domain specific logic still must be written by hand, line by line, or pieced together from relatively simple available components.

Even more recently, power tools which utilize object oriented languages have been developed. One such tool is VisualAge for Smalltalk from the International Business Machines Corporation, for which the underlying language is the object oriented language known as Smalltalk. The nature of object oriented languages lends itself to reusability of code in the form of parts or objects. Still, few commercial components or parts are available which contain complex GUI elements and/or functionality, so developers must still write complex GUI elements and functionality method by method.

Today, one of the fastest growing uses for computers and computer software is in the area known as multimedia. Relative to computers and computer software, a multimedia software application is an application that combines at least two elements from a list including video, audio, text, graphics and animation, and which can be displayed on a display device and with which a user can interact. Given the elements available for use by multimedia software, using computers can be made simpler and more interesting. The use of multimedia software is expanding rapidly, especially in public or semi-public situations, since multimedia software can be developed such that little expertise can be required on the part of an end user. Multimedia applications are gaining popularity for kiosks or direct customer access machines (such as automatic teller machines), in computer training, and educational and game titles. For such public or semi-public applications, the interactive aspect of multimedia must be easily understandable and intuitive to use or the applications will not gain widespread acceptance. For public or semi-public applications, the use of a standard keyboard or mouse for data entry/user interaction is often not practical, or the end users may not be computer literate enough to effectively interact via a keyboard or mouse, so other means for data entry by end users must be provided in the application itself. Accordingly, multimedia applications must have graphical user interfaces and data entry means which are readily understandable by end users and intuitive to interact with and enter data into.

However, even using the most advanced power tools having the most refined GUI building capabilities, building such interfaces is often an arduous task. The term "button" denotes a graphical device that identifies a choice for a user of a GUI and serves as a primary means by which a user enters data when a keyboard is not utilized. A user selects the button by using a mouse, touching a touch sensitive screen, etc. The standard GUI building capability for most advanced power tools permits a developer to define and size buttons one at a time. Building a GUI having a set of buttons, such as a keyboard-like input mechanism, is extremely time consuming, and if customization is required, requires writing new code. Modifying individual or sets of buttons already built is a long, difficult process which requires modifying or writing new code with most tools. Building sets of buttons which would seem simple and are necessary for easy user interaction, such as a numeric punch pad for an automatic teller machine or a keyboard for typewriter emulation, is a long, difficult process. At best, even with today's power tools, an application developer must lay out a subset of the GUI and then program line by line the integrating code. This approach is very complex and the finished interface is not readily reusable or modifiable.

Accordingly, a need exists for an improved technique for creating user interfaces capable of accepting user input data which are obvious and intuitive to use.

SUMMARY OF THE INVENTION

Accordingly, an object of the present invention is to provide a system and method for enabling rapid development of user friendly data entry interfaces.

Another object of the present invention is to provide a system and method which provides data entry GUIs which are readily adaptable and modifiable to suit changing needs.

Other objects and advantages of the present invention will be set forth in part in the description and the drawings which follow, and, in part, will be obvious from the description, or may be learned by practice of the invention.

To achieve the foregoing objects, and in accordance with the purpose of the invention as broadly described herein, an object-based component is provided for use in the creation of a customized graphical data entry screen for a software program, comprising first means for providing at least one prebuilt data entry component for use in a data entry screen in a software application, wherein each of the prebuilt data entry components provides a data entry interface designed to permit an end user to interact with the software application and each of the prebuilt data entry components comprises a plurality of end user selectable buttons arranged to permit intuitive interaction by the end user; second means for permitting each of the buttons in each of the prebuilt data entry components to be logically connected with the software application so that the selection of one of the buttons or some of the buttons by an end user invokes an action by the software application. The object-based component may further comprise third means for providing a plurality of choices for predetermined attributes for each of the prebuilt data entry components. The object-based component may further comprise fourth means for permitting the developer to access source code for the prebuilt data entry components so that the developer can modify the prebuilt data entry components. The third means may further provide default settings for each of the predetermined attributes.

A system in a computing environment is also provided for permitting a developer to create a customized graphical data entry screen for a software program, comprising means for defining a number of user selectable buttons to be displayed on the data entry screen; means for defining a size for the user selectable buttons; means for locating the user selectable buttons at future specified locations within the data entry screen; means for labeling the user selectable buttons with desired symbols; and means for defining a connection for each of the user selectable buttons with an underlying program. The system may further comprises means for permitting an intermediate user of the software application to redefine the number of buttons and labeling on the buttons after the software program has been developed. Additionally, the system may further comprise means for permitting an intermediate user to define a time during which the customized graphical data entry screen is inactive. The system may further comprise means for automatically redefining the customized graphical data entry screen by causing the software program to check a database for information on a number of buttons and labeling of the buttons and recreating the customized graphical data entry screen to reflect the information. Means may also be provided for permitting an intermediate user to define a time at which the software program checks the database for the information.

The present invention will now be described with reference to the following drawings, in which like reference numbers denote the same element throughout.

DESCRIPTION OF THE PREFERRED EMBODIMENT

Figure 1:
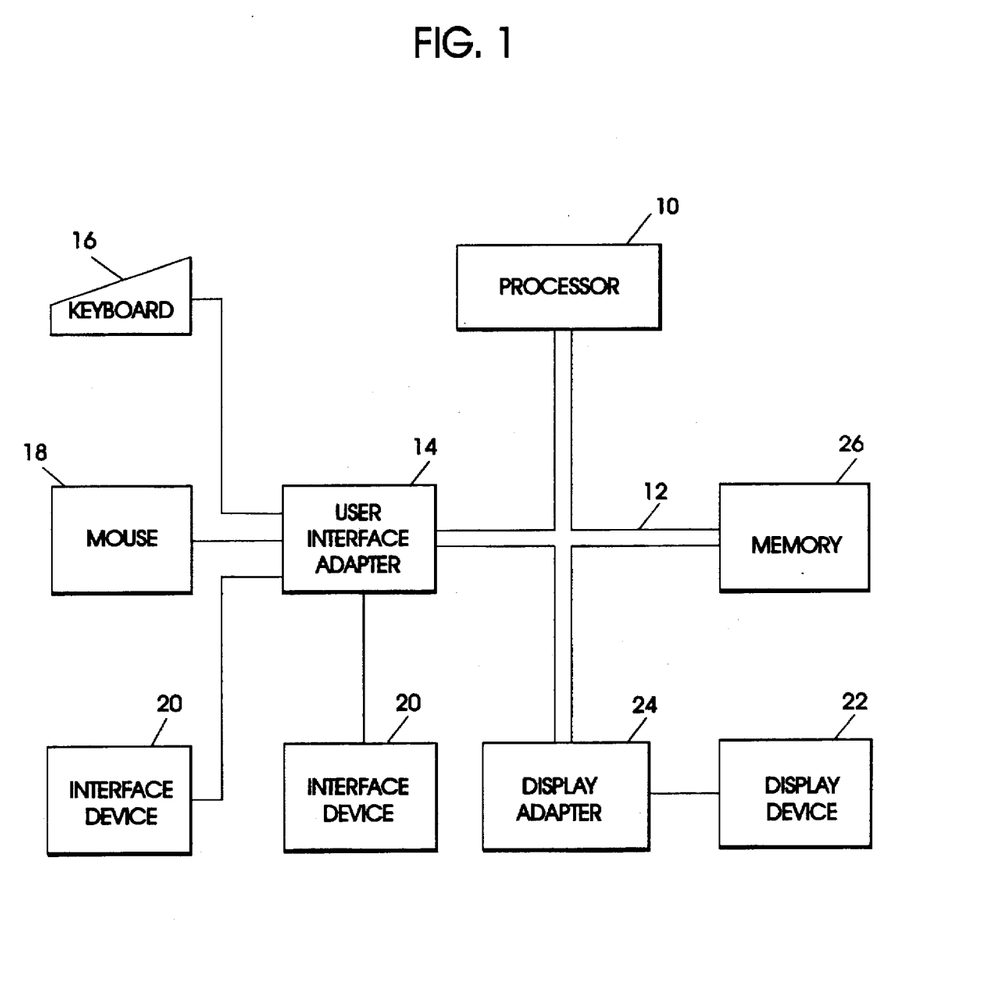
FIG. 1 is a block diagram of a representative hardware environment in which the present invention may be practiced.

The present invention may be performed in any of a variety of computer hardware environments and operating systems and/or software platforms utilizing an object oriented language. FIG. 1 illustrates a representative hardware environment in which the present invention may be practiced. The environment of FIG. 1 is representative of a conventional single user computer workstation, such as a personal computer, and related peripheral devices. The environment includes a microprocessor 10 and a bus 12 employed to connect and enable communication between the microprocessor 10 and the components of the workstation in accordance with known techniques. The workstation will typically include a user interface adapter 14, which connects the microprocessor 10 via the bus 12 to one or more interface devices, such as a keyboard 16, a mouse 18 and/or other user interface devices 20, which can be any user interface device, such as a touch sensitive screen, digitized pen entry pad, etc. The bus 12 also connects a display device 22, such as an LCD screen or CRT, to the microprocessor 10 via a display adapter 24. The bus 12 also connects the microprocessor 10 to memory 26, which can include ROM, RAM, etc.

Software program code which employs the present invention is typically stored in the memory 26 of a standalone workstation, from which a developer may access the code. For distribution purposes, the software program code may be embodied on any of a variety of known media for use with a data processing system, such as a diskette or CD-ROM or may be distributed to users from the memory of one computer system over a network of some type to other computer systems for use by users of such other systems. Such techniques and methods for embodying software code on media and/or distributing software code are well known and will not be further discussed herein.

The present invention is described below in its preferred embodiment, in which the present invention is written in the Smalltalk language for operation in an OS/2 operating system environment. Smalltalk is an object oriented language, and supports the concept of reusable objects. In object oriented programming languages, such as Smalltalk and C++, objects are software entities comprising data structures (i.e., state information) and operations on the data (i.e., behavior). As such, objects are able to model real world entities in terms of characteristics (represented by data elements) and behavior (represented by data manipulation functions). Object oriented programming has inherently therein a number of basic characteristics which are not found in procedural programming languages, including encapsulation, polymorphism, and inheritance. Objects have incorporated therein the internal structure of their data and algorithms. Through polymorphism, a software component or object may make a request of another component or object without knowing exactly what that component or object is. The object or component which receives the request interprets the request and determines, in accordance with its internal data and functions, how to execute the request. The concept of inheritance permits ease in modification of an object or a class. A developer can write a subclass which inherits behavior from all of its parent classes. The developer, by customizing the subclass, can effectively customize the entire hierarchy of classes to meet the developer's own needs. Thus, the bulk of the software may be reused without requiring extensive new coding, recoding, or modifications.

All these properties of object oriented programming, as well as related object oriented programming techniques, are well known to those skilled in the art, and will not be discussed in depth herein. From the description provided herein, a skilled programmer could implement the invention. While the present invention will be described in terms of a part designed for a Smalltalk power tool, such as VisualAge, the present invention may easily be embodied by a skilled programmer as an OpenDoc part, an OLE component, a C++ class library, a Visual Basic control, etc.

Figure 2:
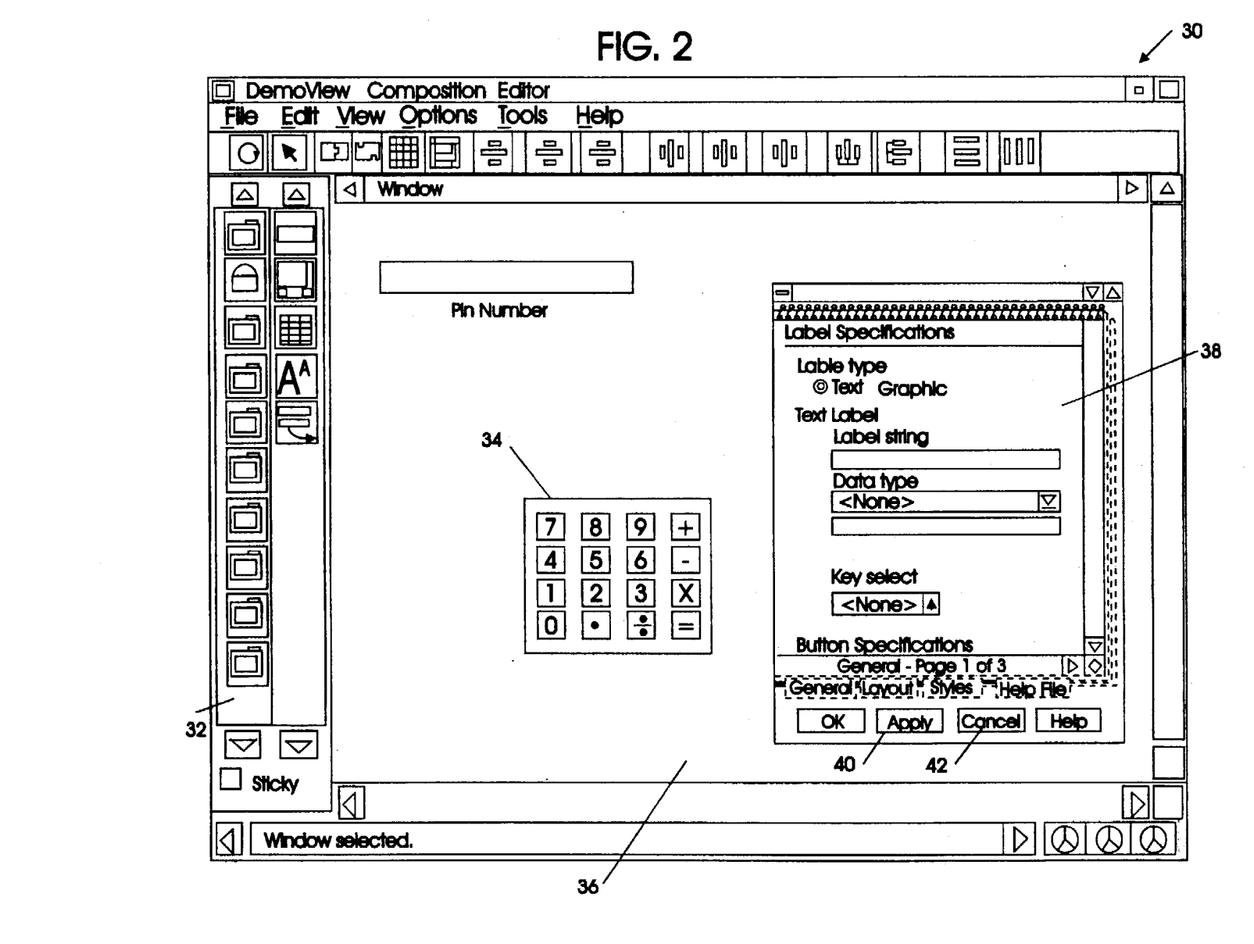
FIG. 2 illustrates a graphical user interface from a power tool in which a data entry interface part has been selected for use in constructing a GUI screen for an application.
Figure 3A:
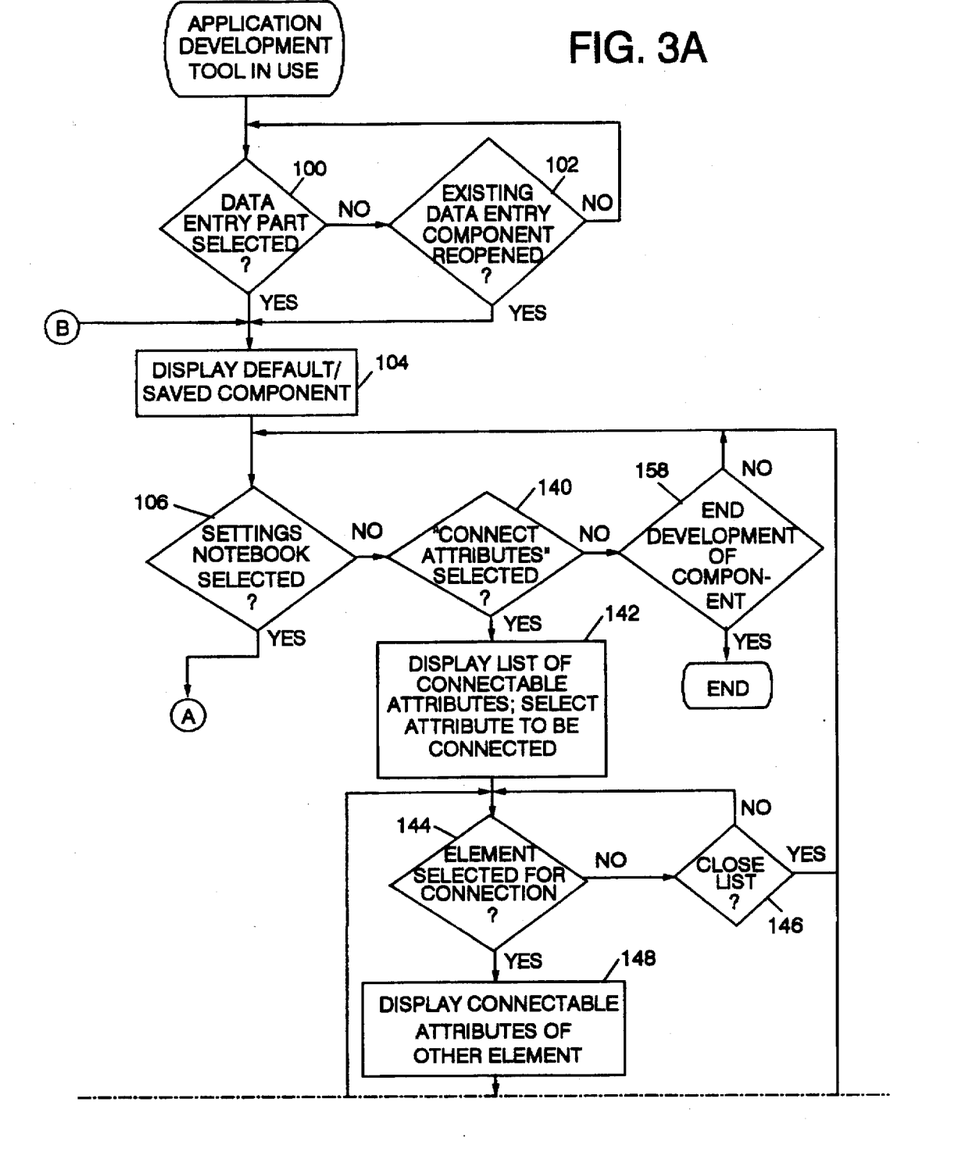
FIGS. 3A–3B are flowcharts illustrating the logical steps involved with manipulating and customizing a data entry interface part for an application being developed in a visual power tool environment.
Figure 3B:
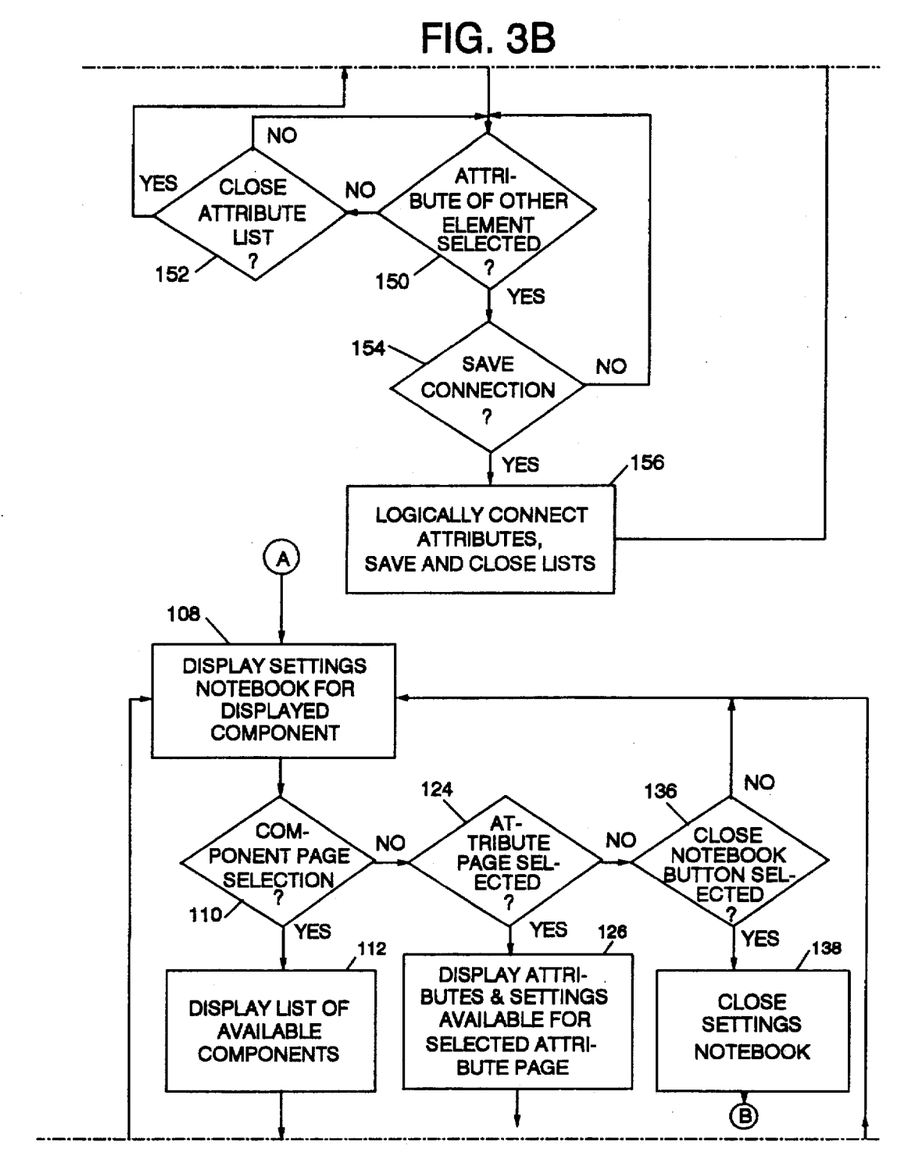
Figure 3C:
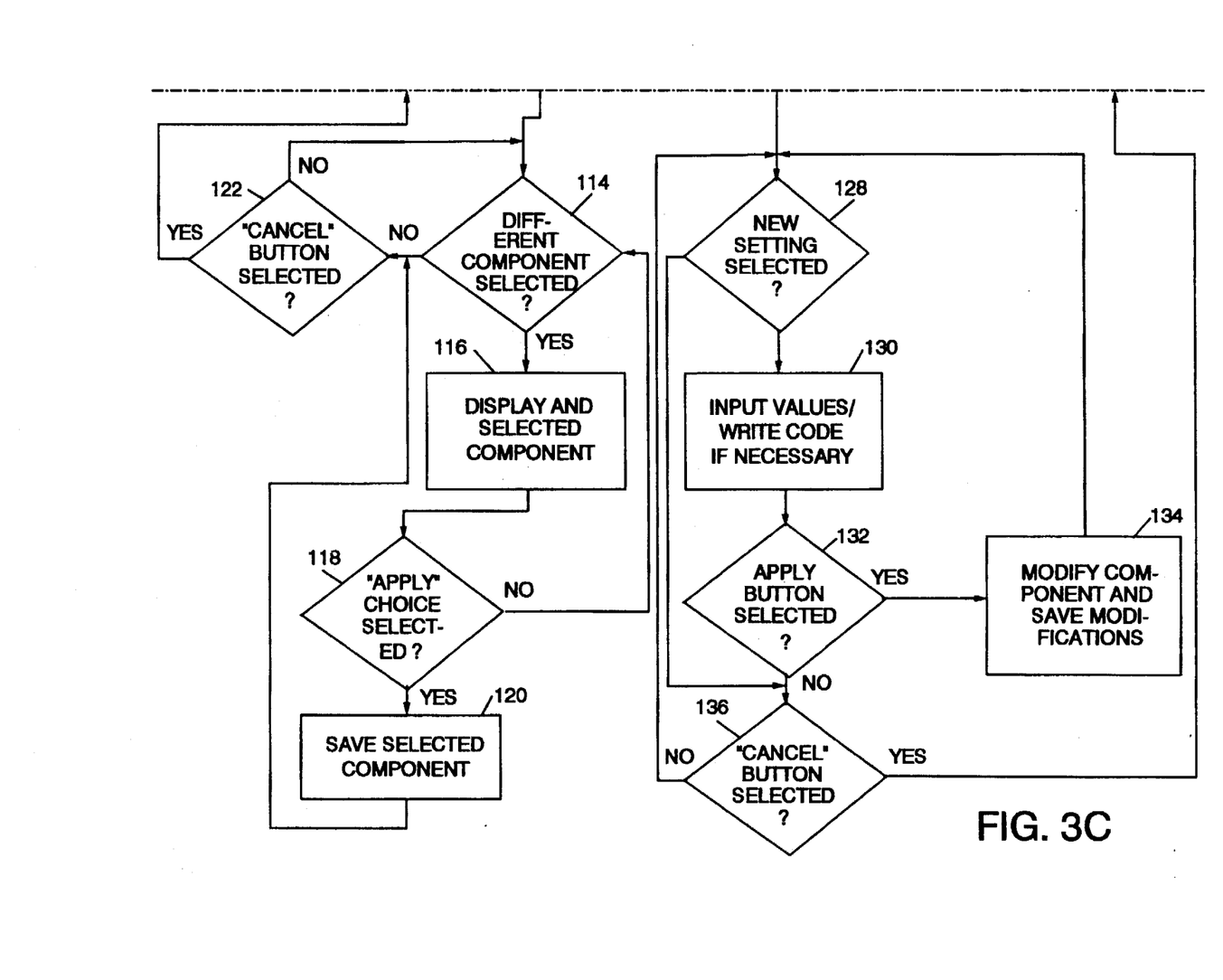

The present invention will now be described with reference to a screen capture from a typical application-building GUI of a power tool, as illustrated in FIG. 2, and the flowchart of FIGS. 3A-3B.

According to the preferred embodiment, a data entry interface part is provided with or for use with a Smalltalk application development power tool, such as VisualAge for Smalltalk. In such an object oriented power tool environment, a part may be provided with the product by the product vendor or may be provided separately by the product vendor or third party vendor for use with the product. In either case, parts to be used in connection with creating a software application with a power tool are typically tied into the power tool's development environment such that the part may be invoked by manipulation of an iconic representation of the part on the power tool's parts palette.

A builder GUI screen 30 of a power tool in an application creation mode as displayed on the display device 22 is illustrated in FIG. 2. A user of the power tool (an application developer) may invoke a part/add an instance of a part to an application being created by selecting the part from a parts palette 32. The parts palette 32 may have a number of parts graphically represented therein, all of which are available for selection by the developer for use in the software application being developed. Upon selection by the developer of the data entry interface part (Step 100), a graphical representation of a default component style 34 of the data entry interface part is placed by the power tool in a work area or window 36 of the builder GUI screen 30 (Step 104). Additionally, processing can also be invoked on an instance of a part already added to a software application. During the course of development of the application, a developer may reopen a part previously saved by the developer for further processing. As illustrated in Step 102, when a developer reopens a previously saved data entry interface part, a graphical representation of the previously selected data entry interface style as previously saved is displayed in the work area 36 (Step 104). The representation graphically displays the saved component.

At this point in the development process, the developer has a number of options. Through the use of a mouse (by clicking one of the mouse buttons), the developer can choose to process the data entry interface style via a notebook-style settings selection notebook (Step 106). If the developer makes this choice, a settings notebook 38 having a number of options contained in its selectable pages for the displayed component is displayed to the developer in the work area 36 (Step 108). In OS/2 applications, it is well-known to use the notebook paradigm in application development to enable a developer to set specific settings for certain attributes, events and actions (referred to as attributes hereinafter) available relative to the part. The creation and user manipulation of an object oriented part which employs the notebook paradigm and the internal architecture of such a part are also well-known and will not be discussed in detail. Following selection of the settings notebook choice and display thereof in Steps 106 and 108, the developer is provided with several development options, which are discussed below.

Alternatively to the notebook paradigm, a menu which lists the attributes having modifiable settings available for specification relative to a component may be employed. Developer selection of an attribute in such an attribute menu causes a menu or other presentation of available settings for the attribute to be displayed to the developer for possible selection.

As discussed, the data entry interface part preferably provides a number of preconfigured or prebuilt interface "styles" or components for selection by a developer for use in a user interface screen of the software application being developed. A selectable list of these styles is provided on a components page of the settings notebook. Upon selection of the components page from the settings selection notebook 38 (Step 110), a page including a list of available interface styles or components is displayed in the notebook 38 (Step 112). Preferably, the preconfigured styles include a QWERTY keyboard, an alphanumeric entry pad, a free style component, and the calculator-style numeric entry pad 34 of FIG. 2.

Figure 4:
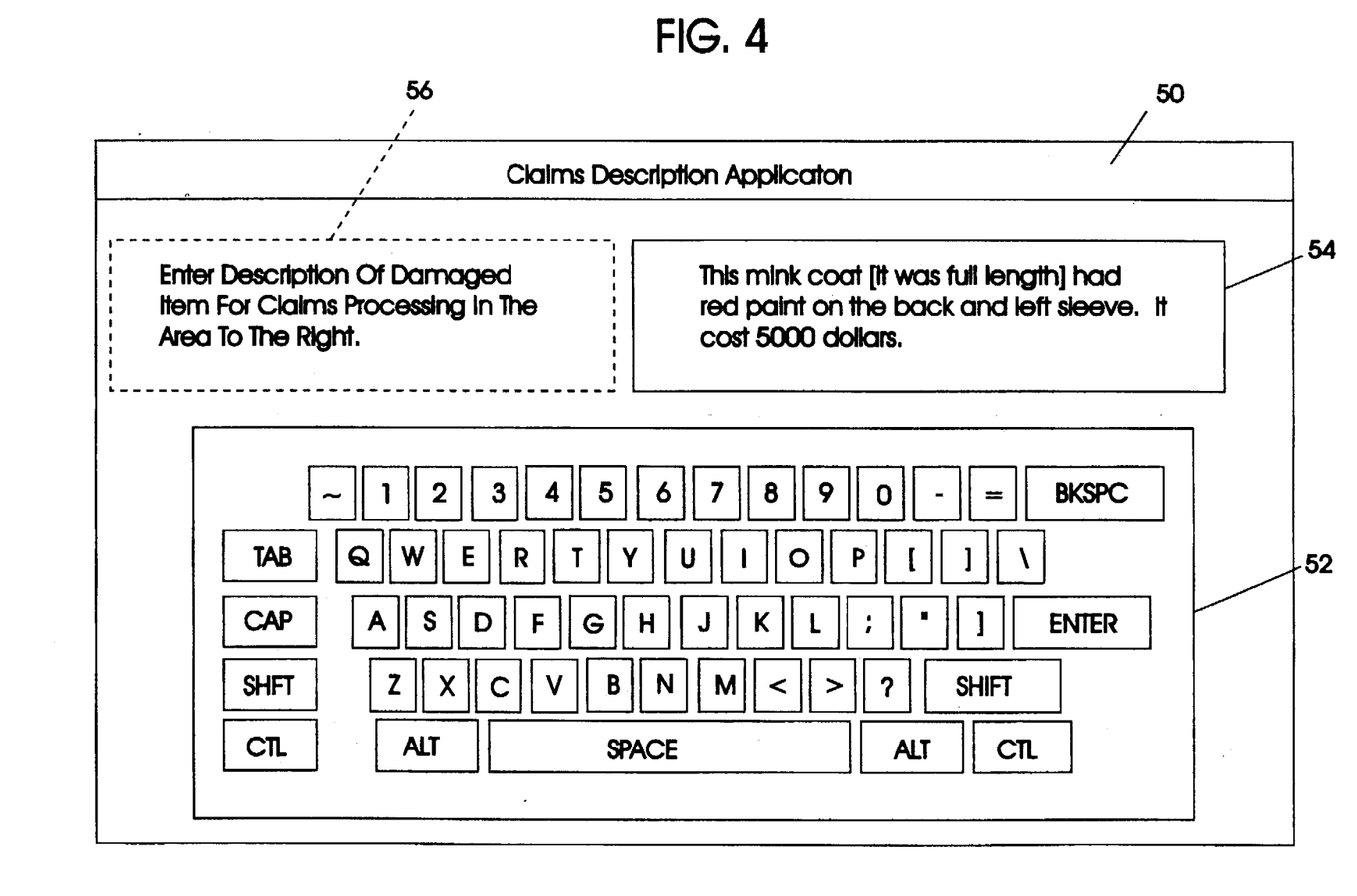
FIG. 4 illustrates an application screen including a QWERTY keyboard data entry interface provided in accordance with the present invention.

FIG. 4 illustrates a user interface screen 50 from an insurance application which utilizes a QWERTY keyboard 52 in combination with a text entry field 54 and a text field 56. The screen 50 may easily be developed using known parts to create the fields 54, 56 and the QWERTY keyboard component of the data entry interface part according to the present invention. As will be described below, the QWERTY keyboard 52 in the instance of the data entry interface part defined for the insurance application can be linked to the instance of the part defined for the text entry field 54 so that as an end user types data into the application via the QWERTY keyboard 52, the data appears in the field 54. The data can also be saved in a database, etc.

Figure 5:
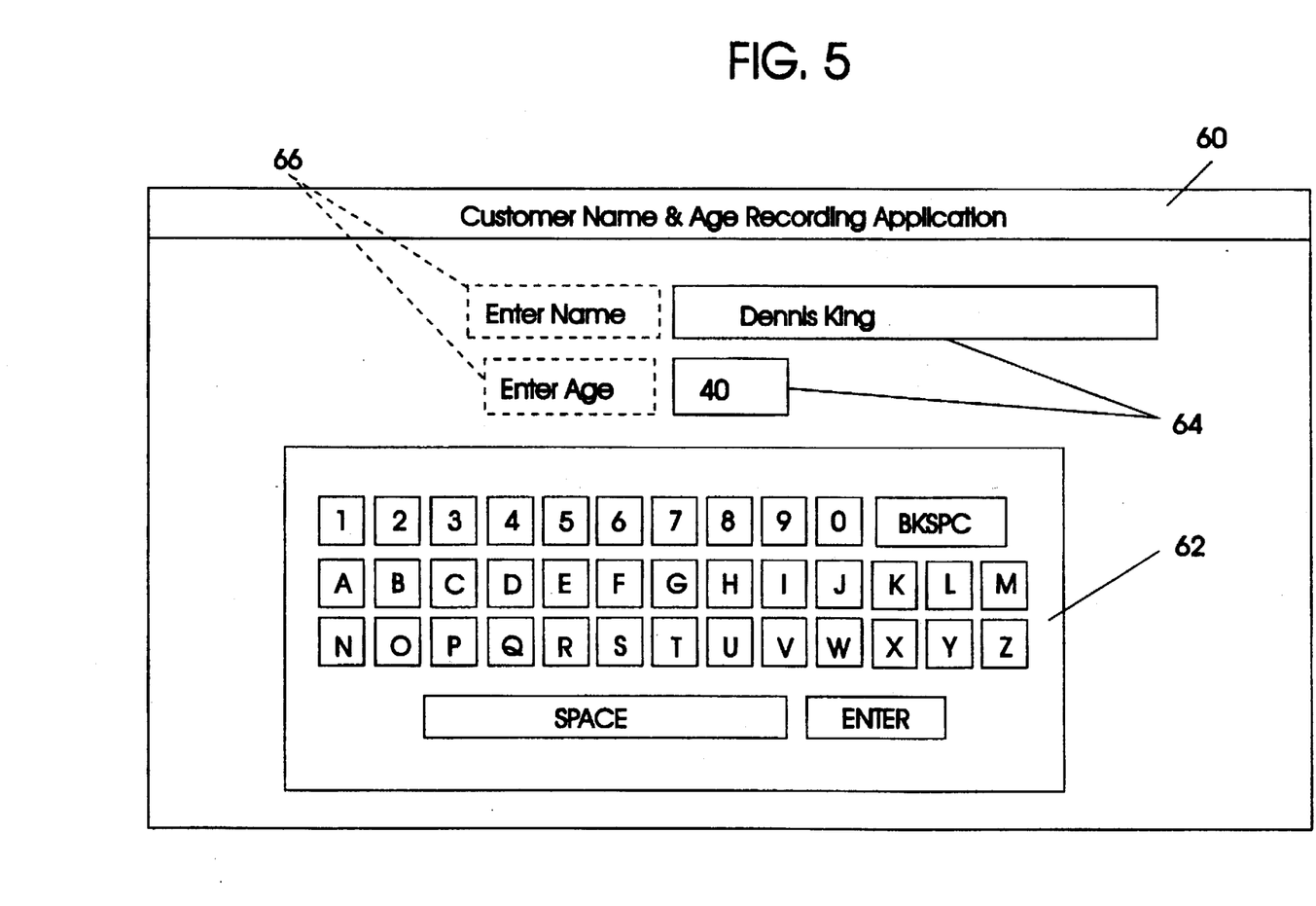
FIG. 5 illustrates an application screen including an alphanumeric data entry interface provided by the data entry interface part in accordance with the present invention.

Similarly, FIG. 5 illustrates a user interface screen 60 from an application designed to receive customer name and age data. The screen 60 utilizes an alphanumeric entry pad 62 in combination with text entry fields 64 and text fields 66.

Figure 6:
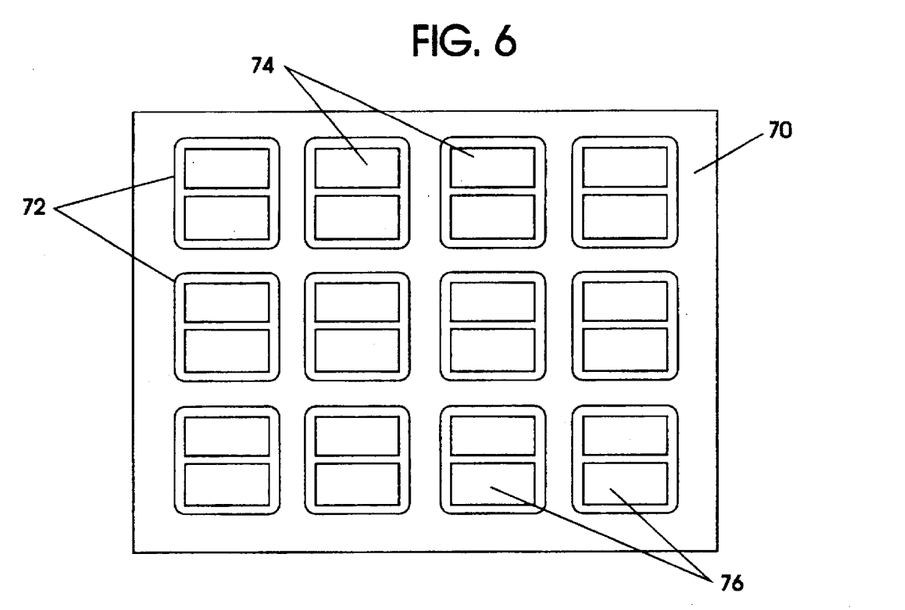
FIG. 6 illustrates a default free style data entry interface provided by the data entry interface part in accordance with the present invention.

FIG. 6 illustrates a default free style data entry keyboard 70. The free style keyboard 70 is provided with maximum flexibility in mind, and includes twelve uniform buttons 72 having text portions 74 for inserting text and graphics portions 76 for inserting graphics. The size, shape, color, number, etc. of buttons 72 are all easily modifiable by the application developer by changing the settings for the free style component, as is described below.

For example, during application development, when the QWERTY keyboard style is selected from the list (Step 114), a prebuilt representation of a QWERTY keyboard having default settings is displayed in the work area 36 as it would appear on a display device when the corresponding screen for the application being developed is displayed to an end user (Step 116). If the developer then selects the "apply" button 40 from the notebook 38 in Step 118, the selected component is saved relative to the application under development (Step 120). However, the developer may instead select a different component from the list, which causes the newly selected component to be displayed (repeating Steps 114 and 116). The developer also has the option to select a "cancel" button 42 at any time after the list of available components is displayed in Step 112. If the "apply" button 40 has not been selected prior to selection of the "cancel" button 42 in Step 122, the developer's selection is not saved.

The selection of the "cancel" button 42 also serves to cause the component page of the notebook 38 to close.

When the developer closes the component page in Step 122, processing returns to Step 108, and the selected (or default) component and its corresponding notebook 38 are displayed, and the developer once again has multiple choices for processing of the data entry interface part. By selecting one of the attributes pages in the settings notebook (Step 124), the developer is presented with a series of choices (settings) relative to the attributes available for selection or modification from the selected attributes page (Step 126). Each component or style has a set of attributes associated therewith, although a number of the attributes are common to all the components. Preferably, relative to each available component, attributes are initially set to default settings, subject to change by the developer. Accordingly, the attributes presented to the developer will be specifically for the selected component (or default component if no component has been selected). The developer selects or sets specific settings for each individual attribute that the developer wants to modify (Step 128). Attributes include the language to be displayed on the buttons (a language attribute), size of the buttons (a size attribute), type font (a font attribute), color (a color attribute), etc. Preferably, relative to each attribute, a setting is provided which permits the developer to modify or add to the code of the part itself to customize the selected component to provide for modifications or additions which are not provided by the preset settings. Further, some settings may request the developer to input values, the input values being the setting, which the part is programmed to use when creating the interface for display (Step 130). Additionally, a user customizable attributes page may be provided to permit a user to define new attributes not provided for in the part.

Preferably, the developer may change the setting for a selected attribute by selecting from among predefined settings displayed in a settings menu associated with the selected attribute (or attributes available on a particular attributes page) and/or inputting values or adding or modifying code (Steps 128, 130). Typically, the settings menu will include a number of different predefined choices, with the existing choice (if any) being highlighted or otherwise distinguished from the other choices in the settings menu.

Following selection of a new setting and/or input of values or code, if the developer wants to save the new setting or code, the developer must select the apply button 40 (Step 132), and the component displayed in the work area 36 is modified to reflect the newly selected setting (Step 134). The developer may then modify or change additional settings from the selected attributes page (Steps 128–132), or close the attributes page (Step 136) by selecting the cancel button 42. The attributes page may be closed prior to any modifications being made and/or saved through Steps 128–132. After the developer chooses to close the attributes page in Step 134 by selecting the cancel button 42, processing again returns to Step 108, and the developer may then select the component page (Step 110), any of the attribute pages (Step 124) or, if the developer has finished working on this portion of the software application or has temporarily completed working on the data entry screen for the software application, the developer may select a close choice (Step 136) which causes the settings notebook 38 to be closed (Step 138). Upon selection of the close choice and closing the settings notebook 38 (Steps 136–138), processing returns to Step 104, and the component and its settings as saved upon the most recent selection of the apply button 40 are displayed.

The developer is also provided with a second option after the processing causes the saved component to be displayed in Step 104. Rather than selecting the settings note book (Step 106), a developer may select a "connect attributes" option (Step 140). When the developer chooses the connect attributes option, a list of connectable attributes from the data entry components is displayed, and the developer may then select an attribute to be connected or linked to another element or part in the application under development (Step 142). The developer then selects the different element in the application to which the selected attribute in the data entry component is to be connected (Step 144). If the developer decides not to select an attribute, the developer may select at any time a cancel option which closes the list (Step 146), and returns processing to Step 104. If the developer does choose to select an element for connection in Step 144, the logic associated with the selected element causes connectable attributes of that element to be displayed in a menu (Step 148). This connectability or linkability or parts or elements is enabled in the architecture of the parts or elements employed with the power tool. The developer then either selects an attribute associated with the other element for connection (Step 150), or closes the attribute list by selecting a cancel option (Step 152). After selection of an attribute for connection in Step 150, the developer must select a save button in order to save the connection (Step 154). Once again, the developer has the option of selecting the cancel option to close the attribute list (Step 152). After the developer selects the save connection choice in Step 154, the attribute in the data entry component and the attribute in the other part or element are logically connected in accordance with the connection logic, which once again, is built into the parts in accordance with the architecture of the parts and is pre-written into the parts or elements when they are created or enabled for the power tool. This type of architecture and linking enablement is known in the art, and need not be discussed in detail.

For example, a "text entered" attribute of the data entry component can be connected to one or more of a variety of other elements, such as a display element, an element which checks a password against a database such as in a banking or ATM application, a part which inputs data to a database for storage, etc. When the "text entered" attribute is connected to a display element, such as the text entry fields 54, 64 or FIGS. 4 and 5, the data entered by an end user of the application is displayed within the text entry field within the application screen as the data is entered by the end user. For password verification, such as with ATM applications, the data entered need not be displayed, but sent to a database for verification upon completion of the entry of the data via a database communication part or element.

In any case, following the logical connection of the attributes, the saving and closing of the lists in Step 156, processing once again returns to the Step 104, in which the saved component is displayed. The first two alternatives available from Step 104, selecting the settings notebook (Step 106) and connecting attributes (Step 140) have been described. The other option at this juncture is to end development relative to the data entry interface part (Step 158). Upon selection of the end development choice, the part is closed. The part may be reopened for use later, or, if the developer has completed working on the part altogether, the part as customized becomes an integrated portion of the application upon packaging. The defined function will be used by end users.

One of the styles available to a developer in accordance with the present invention is a free style data entry component. The free style component is provided in a manner such that the developer is given the broadest possible latitude for developing an interface customized for a specific purpose without having to write code. Referring now to FIG. 6, the free style data entry component 70 with default settings is illustrated. This is displayed when the free style component is selected from the components page of the settings notebook 38 in Step 114. The default settings provide twelve equal-sized buttons 72 having text entry regions 74 and graphics entry regions 76. Attributes associated with the free style component include size of the buttons (all or individual ones), text for the buttons, graphics for the buttons, location of the buttons on the screen of the application, alternatives which enable end users to access all of the buttons if all of the buttons will not fit on a single screen of a finished application, etc. The number and extent of possible attributes is quite large.

For example, one button access alternative is to enable a 'scrolling' setting, whereby a standard scroll bar is employed with the screen to permit end users to scroll buttons onto and off of a single screen in the situations in which the buttons are too numerous to fit on a single screen. A multiple screens setting can be employed, such that if all the buttons do not fit on a single screen, multiple screens having different sets of buttons may be browsed by end users through the use of a page forward/page backward (or similar) icon.

The available attributes become significant in the event that the system administrator is provided with the ability to modify the application after development at its point of use. System administrator modifiable attributes preferably include the number of buttons, text and graphics on the buttons, the time of day certain buttons are displayed or active, etc. Preferably, an attribute which permits system administrator modification of a set of attributes is designated by the developer during development. The process associated with the modification of attributes by a system administrator and refreshing of the data entry component in an application is described with reference to FIGS. 7 and 8.

Figure 7:
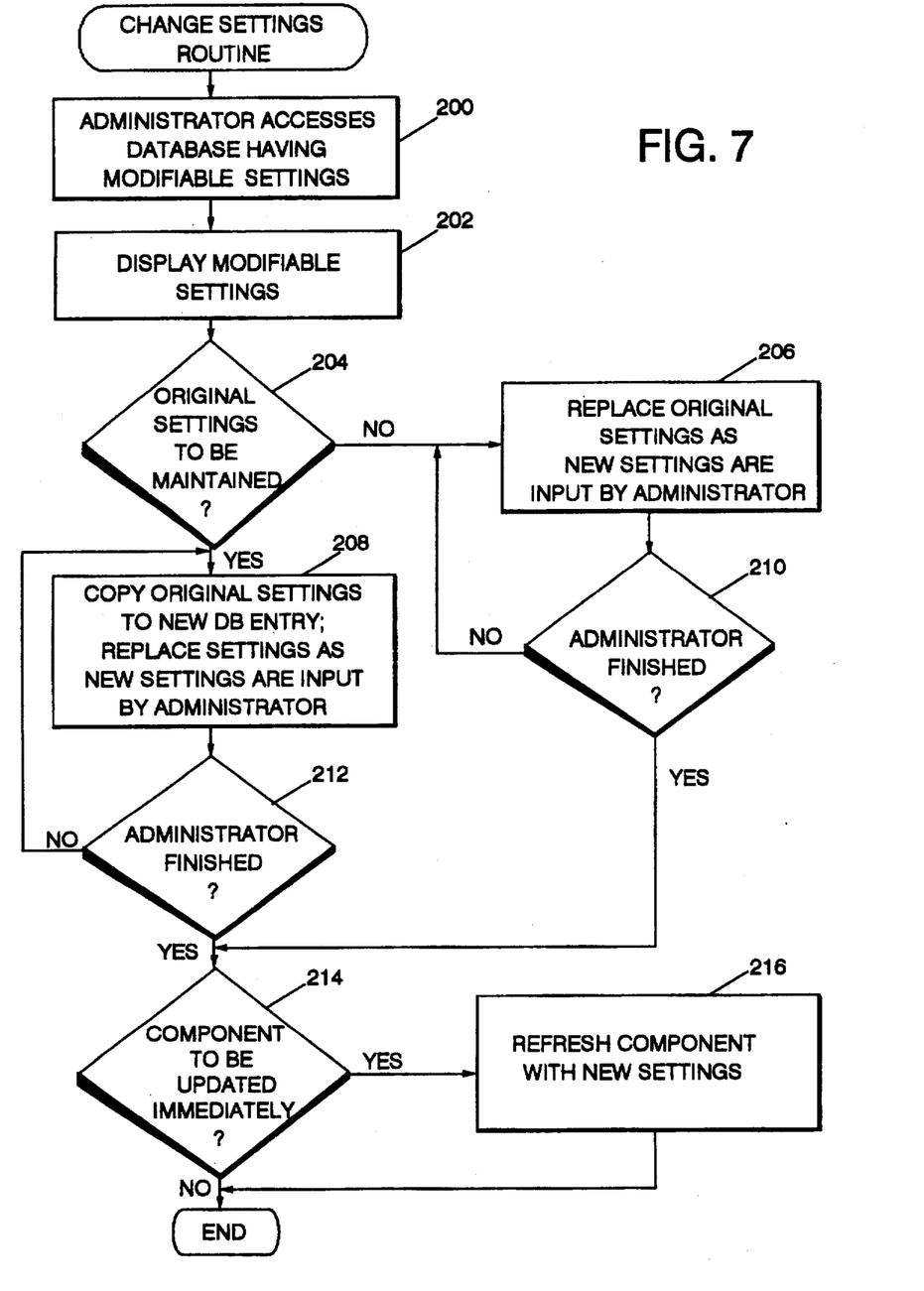
FIG. 7 is a flowchart which illustrates the operation for changing the settings for a free style data entry interface being used by an application.

FIG. 7 illustrates a flow chart which describes the logical steps associated with modifying a data entry component in an existing application. First, the system administrator accesses a database associated with the application which stores the modifiable setting (Step 200). Many techniques existing for associating a database with an application and using the database to update values in the application. The application then displays the modifiable settings to the system administrator (Step 202). If the administrator inputs that it is not necessary to save the original settings in response to a query by the application (Step 204), then any new settings input by the administrator replace the existing settings in the database (Step 206). However, if the administrator inputs in Step 204 that the original settings are to be maintained, the original settings are preferably copied to a new entry in the database, and the original settings are replace in the new database entry with new entries as the new entries are input by the system administrator (Step 208). In either case, once the administrator indicated that no additional new entries are to be input (Step 210 or 212), the administrator then must indicate whether and immediate refresh of the component is desired (Step 214). If not, processing ends immediately, and the new settings will be used to update the component in accordance with a timer function/attribute or upon request of the administrator. If immediate updating is desired, the component is refreshed immediately with the new settings (Step 216). The refresh process is described relative to FIG. 8.

Figure 8:
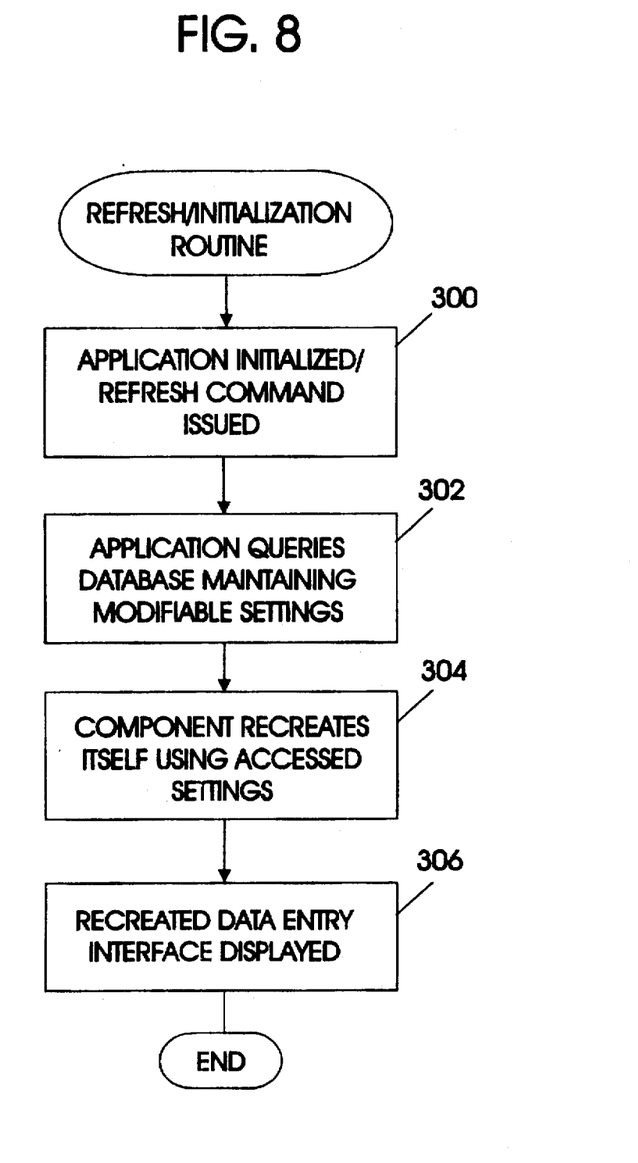
FIG. 8 is a flowchart which illustrates the refresh operation for a free style data entry interface in use in an application.

The flow chart of FIG. 8 illustrates the steps involved with refreshing the component of an active application. A refresh can be initiated in one of several ways. These include the express command of the system administrator (Step 216 of FIG. 7), a time based attribute which causes the application to check a clock such that when a predefined time arrives the component is updated with new settings, or upon initialization of the application. Upon any of these events (Step 300), the application queries the database which maintains the appropriate settings for the component (Step 302). The component then recreates itself in accordance with a recreate method included in the data entry component part (Step 304), and the recreated component is displayed to end users via the display device (Step 306).

Figure 9:
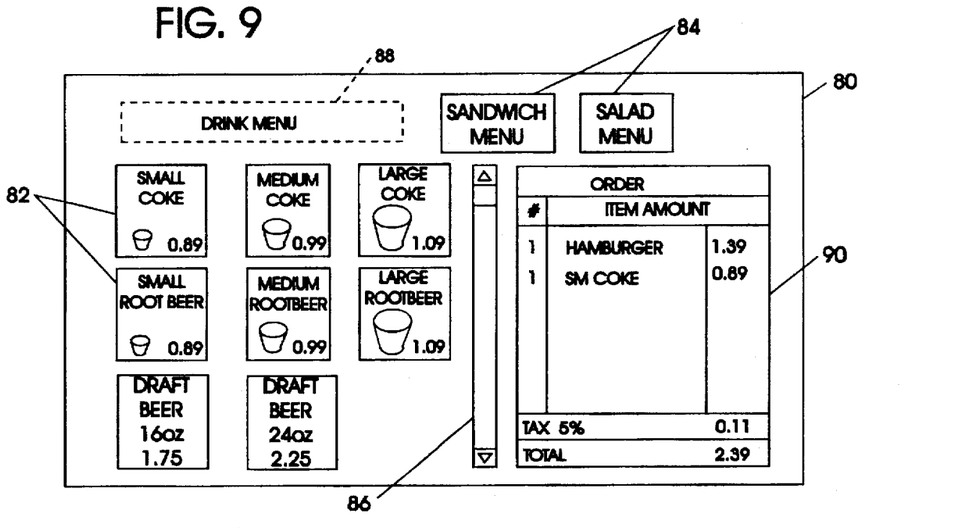
FIG. 9 illustrates a customized free style data entry interface utilized in an application.

FIG. 9 illustrates an example of a customized free style data entry component as integrated into a food ordering application screen 80. Eight buttons 82 are viewable in the screen 80, and include textual and graphical information regarding menu items that the end user may order by touching the buttons (if a touch sensitive display is utilized) or clicking on the buttons with a mouse. Upon selection of one of the buttons 82, the fact that the individual button 82 has been selected is sent to the appropriate portion of the food ordering application for processing. The application should be programmed to know that when the upper left button 82 is selected, the end user is ordering a small cola and that the price of the ordered item is 89 cents. The application will also cause the ordering information to be displayed in the running order menu 90, which is not part of the free style component. The component also includes a scroll bar 86, which graphically indicates that additional drink buttons 82 may be viewed by scrolling down. The component also includes buttons 84, which indicate that other screens of buttons 82 are available with which the end user may interact by selecting these buttons 84. A text entry field 88 is not part of the component, but acts to identify the options the application is providing to the end user.

A food ordering application is also an ideal application in which a time based refresh may be desired by a system administrator. For example, the application can be programmed to refresh the free style data entry component at 11:00 AM every day, so that a database entry which has settings associated with a lunch menu is utilized to refresh the component and populate the application screen.

A developer creates a complete application by combining other parts and newly written code with the customized data interface entry part described herein. The customized instance of the data entry interface part is linked to the rest of the application by connecting attributes or writing connecting code, if necessary. The customized component is displayed and end users interact with the application in accordance with the function provided in the methods of the instance of the data entry interface part included in the application. Once the desired function described herein is understood, an appropriately skilled programmer will be able to create a part or code module which performs the described functions. The function of the part also remains quite extensible, given the nature of object oriented technology, and developers and part designers may add settings for described attributes or entirely new attributes by modifying existing code (methods) within the part or writing new code (methods) for the data entry interface part. By providing this flexibility within the data entry interface part components, an application developer does not have to spend time developing the basic data entry interface, but rather modifies one of the provided styles to suit the requirements of the application.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computer environment, a system for permitting a developer to create a customized graphical data entry screen for a software program, comprising:

means for defining a number of user selectable buttons to be displayed on the data entry screen;

means for defining a size for the user selectable buttons;

means for locating the user selectable buttons at future specified locations within the data entry screen;

means for labeling the user selectable buttons with desired symbols;

means for defining a connection for each of the user selectable buttons with the software program; and means for permitting an intermediate user of the software program which includes the customized graphical data entry screen to redefine the number of buttons and labeling on the buttons after the software program has been developed.

2. A system for permitting a developer to further customize graphical entry data screens according to claim 1, further comprising means for permitting an intermediate user to define a time period during which the customized graphical data entry screen is inactive.

3. A system for permitting a developer to create a customized graphical data entry screen according to claim 1, further comprising means for automatically redefining the customized graphical data entry screen by causing the software program to check a database for information on a number of buttons and labeling of the buttons and recreating the customized graphical data entry screen to reflect the information.

4. A system for permitting a developer to create a customized graphical data entry screen according to claim 3, further comprising means for permitting an intermediate user to define a time at which the software program checks the database for the information.

5. A system for permitting a developer to create a customized graphical data entry screen according to claim 3, further comprising means for checking the database for the information upon initiation of the software program.

6. A system for permitting a developer to create a customized graphical data entry screen according to claim 1, wherein said means for defining a size provides a default size for the user selectable buttons.

7. A system for permitting a developer to create a customizable graphical data entry screen according to claim 1, wherein said labeling means permits the user selectable buttons to be labeled with text and/or images.

8. A reusable object oriented component for use with application development software for creating keyboards for inclusion in applications created with the application development software, comprising:

a plurality of prebuilt keyboards, each of which may be included in an application being developed by a developer, each of said keyboards comprising a plurality of end user selectable buttons;

means for permitting each of the buttons of each of said keyboards to be logically connected with the software application for use by an end user of the software application; and means for permitting an intermediate user to customize graphical aspects of the end user selectable buttons, including at least one of location, labeling, size and a number of the end user selectable buttons, for each of said keyboards.

9. A reusable object oriented component according to claim 8, further comprising means for permitting the developer to access object oriented source code for each of said keyboards so that the developer can tailor each of said prebuilt keyboards for the application being developed.

10. A reusable object oriented component according to claim 8, wherein one of said keyboards is a QWERTY-style keyboard.

* * * * *